Sept. 22, 1970    S. A. WARREN    3,529,364
FLASH RECOGNITION TRAINING SYSTEM
Filed Jan. 22, 1968
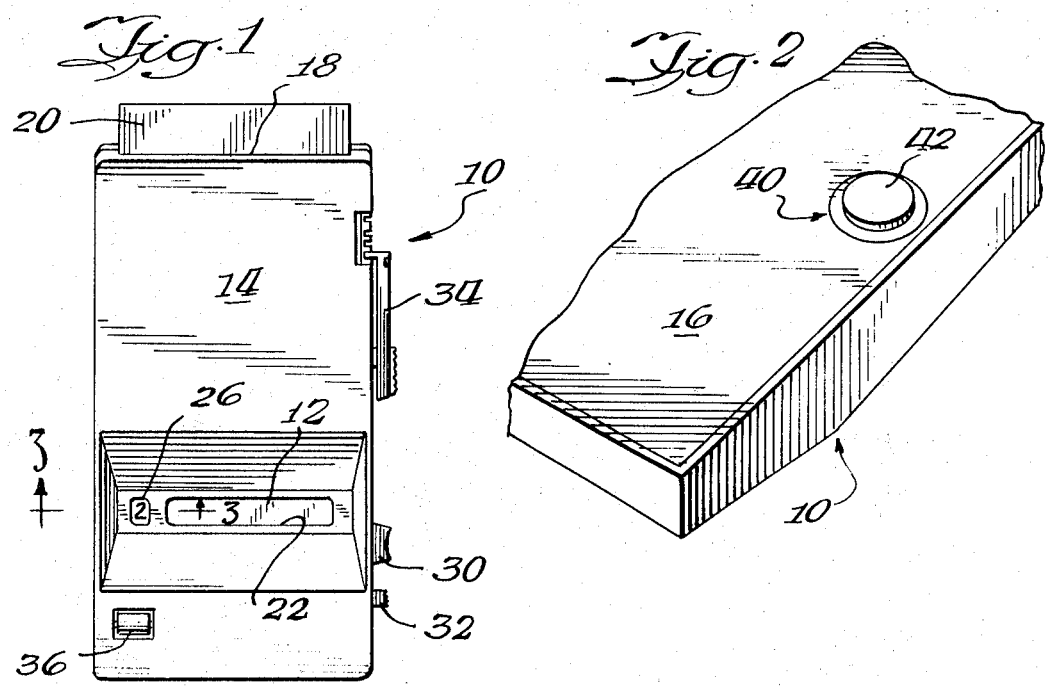
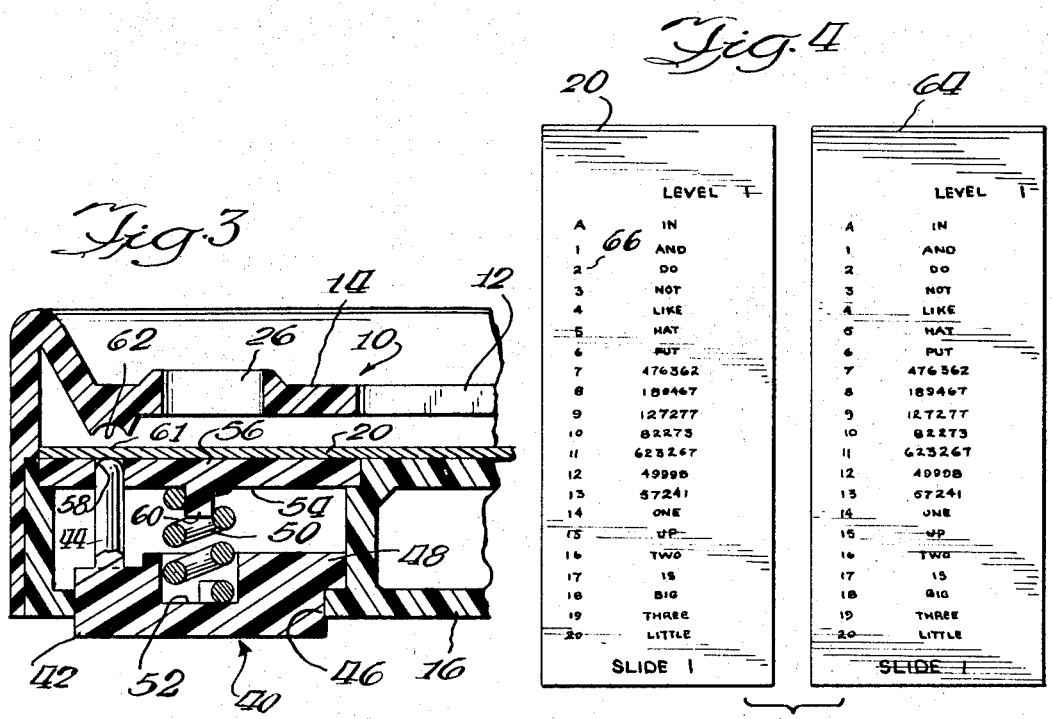
INVENTOR
Steven A. Warren
BY Dressler, Goldsmith, Clement & Gordon
ATTORNEYS

United States Patent Office 3,529,364
Patented Sept. 22, 1970

3,529,364
FLASH RECOGNITION TRAINING SYSTEM
Steven A. Warren, 480 Saunders Road,
Lake Forest, Ill. 60045
Filed Jan. 22, 1968, Ser. No. 699,633
Int. Cl. G09b 17/04
U.S. Cl. 35—35                                                       4 Claims

ABSTRACT OF THE DISCLOSURE

A flash recognition training system including a near-point tachistoscope, viewing sheets with symbols printed thereon and control sheets with corresponding symbols printed thereon. The tachistoscope includes a marking device for marking a viewing sheet in response to a determination by the operator as to whether he believes a symbol on the viewing sheet is identical to a corresponding symbol on the control sheet.

---

This invention relates to a near-point tachistoscope for use with a viewing sheet containing symbols to be recognized when momentarily exposed. Devices of this general type have been used for some time in the field of reading improvement, since it has been found that "flashing" or momentarily exposing words, numerals and other symbols for recognition by the person seeking to improve his reading skill will help improve his rate of reading through speeding up his rate of recognition of such symbols.

Existing flash recognition training systems require the insertion into the tachistoscope of a sheet having symbols printed thereon. The shutter is cocked and, upon release, one of the symbols will be exposed for a fraction of a second, for example, $\frac{1}{100}$ of a second. The operator generally writes down what he thought he saw, and after a number of or all of the symbols on the sheet have been exposed to the operator and he has written down what he thought he saw, his notes are compared with the actual symbols on the sheet to see if he correctly recognized the actual symbols.

Some persons do not wish to expend the effort required to transcribe the symbols (which symbols often comprise several words or a series of numbers). The present invention provides a flash recognition training system by which it is unnecessary to write down anything during operation of the system, and in this manner the system can be operated more rapidly, and in many cases, more effectively than the existing systems.

In accordance with the illustrative embodiment of the present invention, a flash recognition training system is provided comprising a near-point tachistoscope, a plurality of viewing sheets and a plurality of control sheets. The viewing sheets and the control sheets each contain a series of symbols printed thereon, with the symbols on each of the viewing sheets corresponding to the symbols on one of the control sheets except for minor differences in some of, but not all of, the series of symbols. In this manner, the operator can attempt to determine if a variance exists between one of the series of symbols on the viewing sheets and the corresponding series of symbols on the corresponding control sheets.

The tachistoscope includes a frame with a manually operable shutter mechanism connected thereto. The frame has a slot for receiving the viewing sheets and a viewing window for viewing a series of symbols when the shutter mechanism is actuated. A manually operable marking device is connected to the frame and is positioned to mark a predetermined area of the viewing sheet in response to actuation of the marking device by an operator after the operator determines whether a variance exists between the series of symbols viewed when the shutter mechanism is released and a corresponding series of symbols on the corresponding control sheet.

In the illustrative embodiment of the invention, the marking device comprises a spring-return-biased push button having a pin connected thereto. A member is rigidly connected to the frame for retaining a stationary end of the spring, and the member defines an aperture for receiving and guiding a pin toward the sheet of symbols when the push button is pressed by the operator.

A more detailed explanation of the invention is provided in the following description and claims, and is illustrated in the accompanying drawing, in which:

FIG. 1 is a top plan view of a tachistoscope in accordance with the principles of the present invention;

FIG. 2 is a fragmentary enlarged perspective view of the undersurface of the lower left-hand portion of the tachistoscope of FIG. 1;

FIG. 3 is an enlarged sectional elevation taken along the lines 3—3 of FIG. 1; and FIG. 4 is a top plan view of a viewing sheet and a corresponding control sheet utilized in connection with the system of the present invention.

The illustrative embodiment of the present invention includes a tachistoscope of the type that is adapted to be conveniently held in the hand when it is in use. The tachistoscope 10 is similar in many respects to the tachistoscope described and illustrated in U.S. Pat. No. 3,358,391, issued Dec. 19, 1967. Tachistoscope 10 includes an exposure control member 12 which is positioned within a chamber formed by a top housing member 14 and a bottom housing member 16, which are snap-fitted together. Mating members 14 and 16 define a slot 18 at one end of the tachistoscope 10. A viewing sheet of symbols 20 may be inserted through the slot 18, and pushed into operating position within the tachistoscope.

Near its end opposite the slot 18, the top housing member 14 is provided with an aperture 22 through which the user of the tachistoscope may view symbols on viewing sheet 20 when a portion of the sheet is exposed through a slot (not shown) defined by the exposure control member 12. The housing member 14 is also provided with an indexing aperture 26 adjacent the viewing aperture 22, to facilitate the advancing of the viewing sheet 20 into successive locations in which the symbols on the sheet which are to be viewed by the user will be brought into position for viewing, one after the other, as desired by the user.

The exposure control member 12 carries a finger tab 30, which extends outside the chamber formed by the mating housing members 14 and 16 to an exposed position that permits the user of the device to move the exposure control member into a cocked position. A trigger 32 also extends outside the chamber formed by the mating housing members 14 and 16. The trigger 32 is utilized by the operator to engage and release, as desired, the spring-biased exposure control member.

A time control mechanism 34 is movable to adjust the tension of a spring connected between the time control mechanism and the exposure control member 12. Time control mechanism 34 is employed to govern the time of exposure that is produced when the exposure control member 12 is triggered from its cocked condition into its discharge position, to cause momentary exposure of symbols on sheet 20 when the exposure slot defined by the exposure control member passes through a position of alignment with the viewing aperture 22 of the top housing member 14. As shown in FIG. 1, a roller 36 is connected to the top housing member 14, and the roller is utilized by the operator to advance the viewing sheet 20 as desired.

In accordance with the present invention, a marking device 40 is connected to the tachistoscope 10. The marking device 40 includes a push button 42 having a pin 44 fastened thereto. The push button 42 rides within a slot 46 defined by the lower housing member 16 and has an extension 48 for stopping the outward movement of the push button in response to the bias of a spring 50. Spring 50 is connected between a wall 52 of the push button and a wall 54 of an insert 56. The insert 56 defines a slot 58 through which the pin 44 passes and also has a projection 60 about which the spring 50 is positioned.

When viewing sheet 20 is inserted into the device and the push button 42 is pressed by the operator, the pin 44 will force an area 61 of the viewing sheet against a wall 62, causing a permanent indentation to occur in the area 61 of the viewing sheet. In this manner, the operator can record his comparison of the symbol on the viewing sheet 20 which he thinks he saw, with the corresponding symbol on a control sheet 64. If, for example, the operator determines that the symbol on the viewing sheet 20 is identical to the corresponding symbol on the control sheet 64, the operator will advance the sheet to the next symbol. When the operator determines that a symbol on the viewing sheet 20 is *not* identical to a corresponding symbol on the control sheet 64, the operator will press the push button 42 and cause an indentation to occur adjacent the reference numeral column 66.

After the operator has viewed the entire card, the viewing card 20 is compared with the control card and an indentation should be found adjacent the row in which nonidentical corresponding symbols occur. Of course, the system could be utilized by pressing the push button only when identical corresponding symbols occur and not when the corresponding symbols are different in some respect.

It has been seen that by using the principles of the present invention, it is unnecessary for the operator to write down anything during operation of the system, and in this manner, the operator may be more stimulated to try to improve his reading by using a system incorporating a hand-held near-point tachistoscopic device.

Although an illustrative embodiment has been shown and described, it is to be understood that various modifications and substitutions can be effected without departing from the spirit and scope of the present invention. For example, the specific type of tachistoscopic device illustrated in the accompanying drawing is for illustrative purposes only, and many different types of tachistoscopic devices could be used with satisfactory results. Further, the marking device may take several forms, including but not limited to one in which the viewing sheet is marked in ink when the marking device is actuated.

Although the illustrative embodiment of the invention shown and described herein is simply and economically constructed, convenient to operate and presents a minimum number of protruding parts, no unnecessary limitations should be understood with respect thereto, as modifications will be obvious to those skilled in the art.

What is claimed is:

1. A near-point tachistoscope for use with a sheet of symbols to be recognized when momentarily exposed, which comprises: a frame; a manually-operable shutter mechanism connected to said frame, said frame having a slot for receiving a sheet of symbols and a viewing window for viewing the symbols when said shutter mechanism is actuated; and a manually-operable marking device carried by said frame and positioned to mark a predetermined area of said sheet, immediately following such viewing, in response to actuation of said marking device by an operator; said frame defining means enabling said marking device to be moved from a first plane spaced from the plane of said sheet of symbols to the plane of said sheet of symbols, said marking device being normally biased toward said first plane and being adaptable for positioning in the plane of said sheet of symbols in response to manual pressure.

2. A near-point tachistoscope for use with a sheet of symbols to be recognized when momentarily exposed, which comprises: a frame; a manually-operable shutter mechanism connected to said frame, said frame having a slot for receiving a sheet of symbols and a viewing window for viewing the symbols when said shutter mechanism is actuated; and a manually-operable marking device connected to said frame and positioned to mark a predetermined area of said sheet, immediately following such viewing, in response to actuation of said marking device by an operator; said marking device comprising a spring-return biased push button having a pin connected thereto; a member rigidly connected to said frame for retaining a stationary end of said spring, said member defining an aperture for receiving and guiding said pin towards said sheet of symbols when said push button is pressed by the operator.

3. A flash recognition training system which comprises: a near-ponit tachistoscope; a plurality of viewing sheets and a plurality of control sheets; said viewing sheets and said control sheets each containing a series of symbols printed thereon, said symbols on each of said viewing sheets corresponding to said symbols on one of said control sheets except for minor differences in some of, but not all of, said series of symbols, whereby the operator can attempt to determine if a variance exists between one of said series of symbols on said viewing sheets and the corresponding series of symbols on said corresponding control sheets, said tachistoscope comprising a frame; a manually-operable shutter mechanism connected to said frame; said frame having a slot for receiving said viewing sheets and a viewing window for viewing a series of symbols when said shutter mechanism is actuated; a manually-operable marking device connected to said frame and positioned to mark a predetermined area of said viewing sheets in response to actuation of said marking device by an operator when the operator determines whether a variance exists between the series of symbols viewed after the shutter mechanism is actuated, and the corresponding series of symbols on the corresponding control sheets.

4. A flash recognition training system as described in claim 3, said marking device comprising a spring-return biased push button having a pin connected thereto; a member rigidly connected to said frame for retaining a stationary end of said spring, said member defining an aperture for receiving and guiding said pin towards said sheet of symbols when said push button is pressed by the operator.

References Cited

UNITED STATES PATENTS 2,691,831 10/1954 Jordan.
3,105,310 10/1963 Schaill.

WILLIAM H. GRIEB, Primary Examiner